United States Patent
Lai et al.

(10) Patent No.: US 9,302,254 B2
(45) Date of Patent: Apr. 5, 2016

(54) SYNTHESIS AND USE OF M41S FAMILY MOLECULAR SIEVES

(75) Inventors: Wenyih Frank Lai, Bridgewater, NJ (US); Stephen J. McCarthy, Center Valley, PA (US); Robert Ellis Kay, Easton, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 339 days.

(21) Appl. No.: 14/009,563

(22) PCT Filed: Mar. 12, 2012

(86) PCT No.: PCT/US2012/028819
§ 371 (c)(1),
(2), (4) Date: Oct. 3, 2013

(87) PCT Pub. No.: WO2012/141834
PCT Pub. Date: Oct. 18, 2012

(65) Prior Publication Data
US 2014/0024868 A1  Jan. 23, 2014

Related U.S. Application Data

(60) Provisional application No. 61/475,687, filed on Apr. 15, 2011.

(30) Foreign Application Priority Data

Jun. 24, 2011 (EP) ..................... 11171341

(51) Int. Cl.
*C01B 39/48* (2006.01)
*B01J 29/74* (2006.01)
(Continued)

(52) U.S. Cl.
CPC .............. *B01J 29/74* (2013.01); *B01J 29/0308* (2013.01); *B01J 29/0325* (2013.01);
(Continued)

(58) Field of Classification Search
CPC ... C01B 39/48; B01J 29/0325; B01J 29/0308; B01J 29/041; B01J 29/043; B01J 37/04; B01J 37/009; B01J 37/0045; B01J 37/0201; B01J 37/0018; B01J 2229/20; B01J 2229/42; B01J 2229/186; C10G 45/12; C10G 45/54; C10G 2400/10
See application file for complete search history.

(56) References Cited

U.S. PATENT DOCUMENTS 5,098,684 A * 3/1992 Kresge .................. C01B 37/00
423/305
5,191,134 A 3/1993 Le
(Continued)

FOREIGN PATENT DOCUMENTS

CN  101205071  6/2008
JP  2007-516930 A  6/2007
(Continued)

OTHER PUBLICATIONS

Y.S. Ahn et al., "Characterization of MCM-48 Pellet and Corresponding Catalytic Activity for Friedel-Crafts Alkylation", Studies in Surface Science and Catalysis, vol. 154, pp. 2893-2898, 2005.
(Continued)

*Primary Examiner* — David M Brunsman
(74) *Attorney, Agent, or Firm* — Darryl M. Tyus

(57) ABSTRACT

A process is described for producing an M41S family molecular sieve. The process comprises preparing a synthesis mixture capable of forming said molecular sieve in a reactor, which is equipped with a mixer having a Froude number of at least 1, said synthesis mixture having a solids content of at least 20 wt %. The synthesis mixture is heated in the reactor while agitating the mixture with said mixer to form a product mixture comprising water and crystals of said molecular sieve material. Thereafter at least part of the water is removed from the product mixture in the reactor so as to decrease the water content of the product mixture inside the reactor by at least 5 wt %.

15 Claims, 2 Drawing Sheets

(51) Int. Cl.
*B01J 37/04* (2006.01)
*B01J 29/03* (2006.01)
*B01J 29/04* (2006.01)
*B01J 35/10* (2006.01)
*B01J 37/00* (2006.01)
*B01J 37/02* (2006.01)
*C10G 45/12* (2006.01)
*C10G 45/54* (2006.01)
*B01J 29/70* (2006.01)

(52) U.S. Cl.
CPC .............. *B01J 29/041* (2013.01); *B01J 29/043* (2013.01); *B01J 29/70* (2013.01); *B01J 35/1023* (2013.01); *B01J 37/0009* (2013.01); *B01J 37/0018* (2013.01); *B01J 37/0045* (2013.01); *B01J 37/0201* (2013.01); *B01J 37/04* (2013.01); *C01B 39/48* (2013.01); *C10G 45/12* (2013.01); *C10G 45/54* (2013.01); *B01J 2229/186* (2013.01); *B01J 2229/20* (2013.01); *B01J 2229/42* (2013.01); *C10G 2300/1062* (2013.01); *C10G 2400/10* (2013.01)

(56) References Cited

U.S. PATENT DOCUMENTS

| | | | |
|---|---|---|---|
| 5,198,203 | A | 3/1993 | Kresge et al. |
| 5,246,689 | A | 9/1993 | Beck et al. |
| 5,558,851 | A | 9/1996 | Miller |
| 6,099,820 | A | 8/2000 | Miller |
| 6,521,585 | B1 | 2/2003 | Yamashita et al. |
| 6,664,352 | B1 | 12/2003 | Fredriksen et al. |
| 7,572,749 | B2 | 8/2009 | Beeckman et al. |
| 2003/0003035 | A1 | 1/2003 | Stamires et al. |
| 2003/0017937 | A1 | 1/2003 | Ihm et al. |
| 2007/0059237 | A1 | 3/2007 | Miller |
| 2010/0280290 | A1* | 11/2010 | Lai ............ B01J 29/0308 568/959 |

FOREIGN PATENT DOCUMENTS

| | | |
|---|---|---|
| JP | 2008-162238 A | 7/2008 |
| WO | WO 2005/066068 | 7/2005 |
| WO | WO2006/070073 | 7/2006 |
| WO | WO2007/094937 | 8/2007 |
| WO | WO2007/094950 | 8/2007 |
| WO | 2008/097481 | 8/2008 |
| WO | WO 2009/055215 | 4/2009 |

OTHER PUBLICATIONS

Y.S. Ahn et al., "*Friedel-crafts alkylation over Al-incorporated mesoporous honeycomb*", Studies in Surface Science and Catalysis, vol. 146, pp. 669-672, 2003.

Y.S. Ahn et al., "*29-P-27-Fabrication of honeycomb structures with powder MCM-48 silica*", Studies in Surface Science and Catalysis, vol. 135, p. 318, 2001.

J.S. Beck et al., "*A New Family of Mesoporous Molecular Sieves Prepared with Liquid Crystal Templates*", J. Amer. Chem. Soc., vol. 114, Issue 27, pp. 10834-10843, 1992.

J.S. Reed, *Principles of Ceramics Processing*, Second Edition, John Wiley & Sons, Inc., pp. 347-354, 1995.

Moriyama, R. et al. "Large-scale synthesis of artificial zeolite from coal fly ash with a small charge of alkaline solution," FUEL 84, Elsevier Publishing, pp. 1455-1461 (2005).

* cited by examiner

SYNTHESIS AND USE OF M41S FAMILY MOLECULAR SIEVES

CROSS-REFERENCE TO RELATED APPLICATIONS

This application is a National Stage Application of International Application No. PCT/US2012/028819, filed Mar. 12, 2012, and claims the benefit of and priority to U.S. Provisional Application Ser. No. 61/475,687, filed Apr. 15, 2011, the contents of which are incorporated by reference in their entireties.

FIELD OF THE INVENTION

This disclosure relates to a method for synthesizing M41S family molecular sieves and to use of the resultant molecular sieves as catalysts, for example, in lube hydrofinishing.

BACKGROUND OF THE INVENTION

Porous inorganic solids have found great utility as catalysts and separations media for industrial applications. The openness of their microstructure allows molecules access to the relatively large surface areas of these materials that enhance their catalytic and sorptive activities. The porous materials in use today can be sorted into three broad categories using the details of their microstructure as a basis for classification. These categories are the amorphous and paracrystalline materials, the crystalline molecular sieves and modified layered materials. The detailed differences in the microstructures of these materials manifest themselves as important differences in the catalytic and sorptive behavior of the materials, as well as in differences in various observable properties used to characterize them, such as their surface areas, the sizes of pores and the variability in those sizes, the presence or absence of X-ray diffraction patterns and the details in such patterns, and the appearance of the materials when their microstructure is studied by transmission electron microscopy and electron diffraction methods.

The M41S family of mesoporous molecular sieves is described in *J. Amer. Chem. Soc.*, J. S. Beck et al., 1992, Vol. 114, Issue 27, pp. 10834-10843. Members of the M41S family of molecular sieves include MCM-41, MCM-48 and MCM-50. A member of this class is MCM-41 whose preparation is described in U.S. Pat. No. 5,098,684. MCM-41 is characterized by having a hexagonal structure with a unidimensional arrangement of pores having a cell diameter greater than about 13 Angstroms. MCM-48 has a cubic symmetry and is described for example in U.S. Pat. No. 5,198,203. MCM-50 has a layered or lamellar structure and is described in U.S. Pat. No. 5,246,689.

The M41S family mesoporous molecular sieves are often prepared from aqueous reaction mixtures (synthesis mixtures) comprising sources of appropriate oxides. Organic agents, such as surfactant(s), are also generally included in the synthesis mixture for the purpose of influencing the production of the M41S family mesoporous molecular sieves having the desired structure and channel size. After the components of the synthesis mixture are properly mixed with one another, the synthesis mixture is subjected to appropriate crystallization conditions in an autoclave. Such conditions usually involve heating of the synthesis mixture to an elevated temperature possibly with stirring. After crystallization is complete, the crystalline product is recovered from the remainder of the synthesis mixture, typically by filtering the crystals and then washing the crystals with water to remove the mother liquor and other residual synthesis mixture components. The crystals are then normally dried and subjected to high temperature calcination, e.g., at 540° C., particularly to remove any organic agent which may otherwise block the pores of the molecular sieve.

The process of synthesizing the M41S family mesoporous molecular sieve utilizes expensive organic surfactants. Moreover, significants costs are incurred for disposal of surfactant-containing wastewater generated in the crystallization, filtration, and washing. Thus a need exists for a more efficient and cost-effective process of manufacturing M41S family molecular sieves which reduces both the amount of water used and wastewater produced. This disclosure provides a process of manufacturing M41S family molecular sieves from forming mixtures of high solids content, using a reactor having a high intensity mixer. The process does not require filtering the reaction mixture after crystallization or washing the molecular sieve product before calcinations. Accordingly, the process combines the advantages of reduced cost, shorter crystallization time and higher yield with the minimization of wastewater generated during the molecular sieve manufacture.

U.S. Patent Application No. 60/899,785, filed Feb. 6, 2007 (priority claimed in WO2008/097481, dated Aug. 14, 2008), relates to a method for synthesizing a mesoporous molecular sieve composition, in which at least a portion of the solvent or solvent mixture in the reaction mixture comprises wastewater from processing of the mesoporous molecular sieve made in previous synthesis batches, e.g., the mother liquor(s), the washing liquid(s), the cleaning liquid(s), and any combination thereof.

U.S. Patent Application Publication No. 2010/0280290 relates to a method of making M41S materials using synthesis mixture having high solids content and reducing wastewater containing surfactant(s), such as, mother liquor, formed in the synthesis, as well as minimizing or eliminating filtrating and/or washing step(s) of the synthesis.

WO 2009/055215 teaches making M41S materials from high solids forming mixtures (20% to 50 wt %) which can be recovered without a purification step (filtration and/or washing). Crystallization can be carried out under static or agitated conditions (paragraph 0083) but no disclosure or suggestion of using high intensity mixers for M41S crystallization is made.

U.S. Pat. No. 6,664,352 to Fredriksen teaches preparing metallocene catalysts by mixing catalyst and porous particulate support in a mechanically fluidized state with a catalyst material. The process uses a mixer having horizontal axis counter-rotating interlocking mixing paddles where paddles on different but preferably parallel rotational axes pass through a common mixing zone. The mixer can have a Froude number of from 1.05 to 2.2. No suggestion or disclosure is made for using this mixer in the crystallization of molecular sieves.

U.S. Pat. No. 6,521,585 to Yamashita et al. discloses the production of crystalline alkali metal silicate granules which are stably formulated in detergents. Temperature-controllable agitating mixers carry out mixing crystalline alkali metal silicate with detergent at a Froude number of 1 to 12 to control particle size distribution of granules. Mixers include horizontal, cylindrical blending vessels having agitating impellers on an agitating shaft.

Various mixers useful to mix slurries, pastes, and plastic bodies are described in "Principles of Ceramics Processing," Second Edition, James S. Reed, John Wiley & Sons, Inc., 1995, at pages 347-354.

SUMMARY OF THE INVENTION

In one aspect, the invention resides in a process for producing a molecular sieve material having an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C., said process comprising the steps of:

(a) preparing a synthesis mixture capable of forming said molecular sieve material by combining in a reactor, which is equipped with a mixer having a Froude number of at least 1, at least water, a source of at least one oxide selected from the group consisting of divalent element W, trivalent element X, tetravalent element Y and pentavalent element Z, a source of an alkali or alkaline earth metal M, and an organic directing agent (R) having the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof and the remainder of $R_1$, $R_2$, $R_3$ and $R_4$ is selected from the group consisting of hydrogen, alkyl of from 1 to 5 carbon atoms and combinations thereof, said synthesis mixture having a solids content of at least 20 wt %;

(b) heating the synthesis mixture in the reactor while agitating the mixture with said mixer to form a product mixture comprising water and crystals of said molecular sieve material; and then (c) removing at least part of the water from the product mixture in the reactor so as to decrease the water content of product mixture inside the reactor by at least 5 wt %.

Conveniently, said synthesis mixture has a solids content of about 20 wt % to about 50 wt %.

In one embodiment, the synthesis mixture has a composition, in terms of mole ratios, within the following ranges:

| | |
|---|---|
| $X_2O_3/YO_2$ | 0 to 0.5 |
| $X_2O_3/(YO_2 + Z_2O_5)$ | 0 to 100 |
| $X_2O_3/(YO_2 + WO + Z_2O_5)$ | 0 to 100 |
| $H_2O/(X_2O_3 + YO_2 + WO + Z_2O_5)$ | 2 to 10 |
| $OH^-/YO_2$ | 0 to 10 |
| $M_{2/e}O/(X_2O_3 + YO_2 + WO + Z_2O_5)$ | 0 to 10 |
| $R_{2/f}O/(X_2O_3 + YO_2 + WO + Z_2O_5)$ | 0.01 to 2 |

In another embodiment, the synthesis mixture has a composition, in terms of mole ratios, within the following ranges:

| | |
|---|---|
| $X_2O_3/YO_2$ | 0 to 0.5 |
| $H_2O/(X_2O_3 + YO_2)$ | 2 to 10 |
| $OH^-/YO_2$ | 0.1 to 10 |
| $M_{2/e}O/(X_2O_3 + YO_2)$ | 0.1 to 10 |
| $R_{2/f}O/(X_2O_3 + YO_2)$ | 0.01 to 2 |

Conveniently, water is removed from the product mixture in (c) by the application of heat to and/or the reduction of pressure on the product mixture.

Conveniently, the product mixture is agitated with the mixer during the removing step (c).

Conveniently, the process further comprises the step:

(d) mixing said partially dried mixture with an additional particulate material, either in the reactor or in a separate mixer, to produce an extrudable mixture.

Conveniently, said additional particulate material is a catalyst formulation component, such as a binder or matrix material.

Conveniently, the process further comprises the step:

(e) extruding said extrudable product mixture into a shaped catalyst body.

Conveniently, the process further comprises the step:

(f) calcining the shaped catalyst body; and (g) subjecting the calcined catalyst body to ion exchange to reduce the level of alkali or alkaline earth metal M in the body.

Conveniently, the shaped body is contacted with a noble metal-containing medium and thereafter calcined in air to provide a catalyst impregnated with noble metal, e.g., the noble metal is selected from platinum, palladium, iridium and mixtures thereof. Preferably, the noble metal comprises platinum, and even more preferably a combination of platinum and palladium.

In one embodiment, the reactor has a capacity of at least 5 liters, such as at least 20 liters, for example, at least 200 liters.

In one embodiment, the mixer comprises at least one blade located on a shaft rotatable about an axis oriented at no more than 10° from horizontal.

In a further aspect, the invention resides in a process for hydrofinishing a lubricant base stock comprising contacting the base stock under hydrofinishing conditions with a catalyst comprising a molecular sieve material produced by the process described herein.

DETAILED DESCRIPTION OF THE EMBODIMENTS

Figure 1:
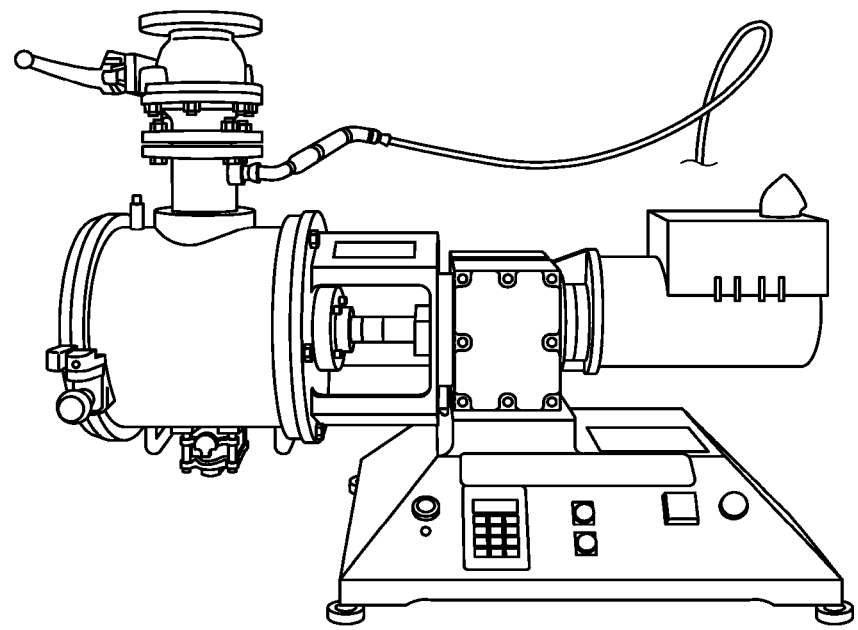
FIGS. 1 and 2 show a 5 gallon commercial pilot-scale horizontal plough shear mixer/dryer/reactor having a top mount charge opening used in the synthesis process of the Examples.

This disclosure provides a novel process for the synthesis of the M41S family of mesoporous molecular sieves. These materials are described in *J. Amer. Chem. Soc.*, J. S. Beck et al., 1992, Vol. 114, Issue 27, pp. 10834-10843 and are characterized by having an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. Members of the M41S family of molecular sieves include MCM-41, MCM-48 and MCM-50.

The present process debottlenecks the synthesis of the M41S materials while reducing the wastewater generated from the synthesis by producing and reacting a high solids content crystallization formulation in a high intensity mixer/reactor and by allowing for extrusion of the M41S crystallization product with an inorganic oxide binder, e.g., alumina, after only partial drying of the crystallized product. This new high solid crystallization procedure offers several advantages over the conventional low (solid content less than 5 wt %) to medium (solid content less than about 15 wt %) solid content crystallization methods. Such advantages include significantly lower production of wastewater containing surfactant, by reducing the amount of mother liquor produced in the synthesis and significantly simplifying the synthesis process by minimizing or eliminating the filtrating and/or the washing step(s), which further reduces the amount of wastewater produced in the synthesis. By using high solids crystallization formulation of this disclosure, the amount of wastewater produced in the synthesis can be reduced by at least 50%.

In the present process an aqueous synthesis mixture having a high solids content of at least 20 wt % is produced and crystallized under agitation in the same reactor equipped with a high-intensity mixer capable of operating at a Froude number of at least 1, such as from 1 to 12, for example from 2 to 10. In this process, the Froude number of an impeller of a high-speed mixer is used as a measure of the resistance of the impeller moving through a fluid medium. In this respect, the Froude number (Fr) of a mixer having an impeller of diameter (d) in meters and rotating at N revolutions per second is defined by the following equation:

$$Fr = N^2 d/g$$

where g is the acceleration due to gravity (9.81 m/s$^2$). Conveniently, the reactor employed in the present process is configured so that the impeller of the high-intensity mixer is mounted on a shaft rotatable about an axis oriented at no more than 10° from horizontal. Typically, the reactor has a length to diameter ratio greater than 0.75, for example greater than 1, such as greater than 1.5 and a capacity of at least 5 liters, such as at least 20 liters, for example at least 200 liters.

The synthesis mixture used in the present process is produced by adding at least the following components to the reactor: water, a source of at least one oxide selected from the group consisting of divalent element W, trivalent element X, tetravalent element Y and pentavalent element Z, a source of an alkali or alkaline earth metal M, and an organic directing agent (R) having the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof and the remainder of $R_1$, $R_2$, $R_3$ and $R_4$ is selected from the group consisting of hydrogen, alkyl of from 1 to 5 carbon atoms and combinations thereof. The contents of the reactor are then mixed using the high-intensity mixer until a homogeneous slurry having the desired solids content is produced. Typically, mixing is effected at a temperature of about 20° C. to about 50° C. for a time of about 30 minutes to about 2 hours.

Generally, the synthesis mixture has a solids content of at least 20 wt %, such as from about 20 wt % to about 50 wt %, preferably at least 25 wt %, such as from about 25 wt % to about 45 wt %, and most preferably at least 30 wt %, such as from about 30 wt % to about 40 wt %. As used herein, the term "solids content" is defined as the percentage by weight of the tetravalent and trivalent element oxides to the total weight of the synthesis mixture (excluding any seeds) and is calculated as follows:

$$\text{Solids content} = \frac{\text{weight of oxides in synthesis mixture} \times 100}{\text{Total weight of synthesis mixture}}$$

Typically, the reaction mixture has an apparent viscosity of at least 10$^5$ MPa sec, such as about 10$^6$ to about 10$^9$ MPa sec.

Examples of suitable oxides of divalent elements, W, that can be included in the synthesis mixture include oxides of divalent first row transition metals, e.g., manganese, cobalt, iron, and/or magnesium.

Examples of suitable oxides of trivalent elements, X, that can be included in the synthesis mixture include oxides of aluminum, boron, iron, and/or gallium, especially aluminum.

Suitable sources of alumina include hydrated aluminum oxides, such as boehmite, gibbsite, and pseudoboehmite, sodium aluminate and oxygen-containing aluminum salts, such as aluminum nitrate.

Examples of suitable oxides of tetravalent elements, Y, that can be included in the synthesis mixture include oxides of silicon, germanium, and tin, with silicon being preferred. Suitable sources of silicon oxides include colloidal silica, precipitated silica, potassium silicate, sodium silicate, and fumed silica. Preferred sources of silica include those containing at least about 30 wt % solid silica, e.g., silica sold by Evonik Degussa under the trade names Aerosil, Ultrasil or Sipernat (a precipitated, spray dried silica containing about 90 wt % silica) and silica sold under the trade name Ludox (available from Grace Davison), or HiSil (a precipitated hydrated SiO$_2$ containing about 87 wt % silica, available from PPG Industries).

Examples of suitable oxides of pentavalent elements, Z, that can be included in the synthesis mixture include oxides of phosphorus.

Examples of suitable alkali or alkaline earth metals, M, include sodium, potassium and calcium, with sodium being preferred. The metal M is generally present in the synthesis mixture as the hydroxide.

Suitable directing agents, R, include cetyltrimethylammonium, cetyltrimethylphosphonium, octadecyltrimethylammonium, octadecyltrimethylphosphonium, benzyltrimethylammonium, cetylpyridinium, decyltrimethylammonium, dimethyldidodecylammonium compounds, and combinations comprising at least one of the foregoing. Preferably, the quaternary ammonium or phosphonium ion is derived from the corresponding hydroxide, halide, or silicate.

An additional organic may also be present in the synthesis mixture along with the above quaternary ammonium or phosphonium directing agent, R. In one embodiment, an additional organic may be the quaternary ammonium or phosphonium ion of the above directing agent formula wherein $R_1$, $R_2$, $R_3$, and $R_4$ are each independently selected from hydrogen and alkyl of 1 to 5 carbon atoms.

Typically, the synthesis mixture used in the present process has a composition, in terms of mole ratios, within the following ranges:

| | |
|---|---|
| $X_2O_3/YO_2$ | 0 to 0.5 |
| $X_2O_3/(YO_2 + Z_2O_5)$ | 0 to 100 |
| $X_2O_3/(YO_2 + WO + Z_2O_5)$ | 0 to 100 |
| $H_2O/(X_2O_3 + YO_2 + WO + Z_2O_5)$ | 2 to 10 |
| $OH^-/YO_2$ | 0 to 10 |
| $M_{2/e}O/(X_2O_3 + YO_2 + WO + Z_2O_5)$ | 0 to 10 |
| $R_{2/f}O/(X_2O_3 + YO_2 + WO + Z_2O_5)$ | 0.01 to 2, | where e and f are the valence of M and R respectively.

Generally, the M41S material produced by the present process is a silicate or aluminosilicate, in which case the synthesis mixture has a composition, in terms of mole ratios, within the following ranges:

| Molar Ratio | Broad | Preferred |
|---|---|---|
| $Al_2O_3/SiO_2$ | 0 to 0.5 | 0.001 to 0.05 |
| $H_2O/SiO_2$ | 2 to 10 | 4 to 8 |
| $OH^-/SiO_2$ | 0 to 10 | 0.05 to 5 |
| $M_{2/e}O/(SiO_2 + Al_2O_3)$ | 0 to 10 | 0.05 to 5 |
| $R_2O/(SiO_2 + Al_2O_3)$ | 0.01 to 2.0 | 0.03 to 1.0 | where e is the valence of the metal M.

When the formation of the synthesis mixture is complete, the temperature of the mixture in the reactor is raised to the desired crystallization temperature, generally in the range of about 25° C. to about 200° C., such as from about 100° C. to about 160° C., and maintained at this temperature for about 0 to about 200 hours, such as about 4 to about 48 hours. During the crystallization process, the synthesis mixture is continuously agitated with the high intensity mixer. In addition, the reactor is normally sealed during the crystallization process so that there is an autogenous rise in pressure in the reactor during the process.

The product of the crystallization process is an aqueous slurry containing the desired mesoporous molecular sieve, such as MCM-41. Normally, the product mixture would be removed from the reactor and, after filtration to remove the mother liquor, the molecular sieve crystals would be washed and dried. However, in the present process, when crystallization is complete, the reactor is unsealed and at least part of the water is removed from the product mixture before removal of the mixture from the reactor. This can be achieved by the application of heat to the mixture and/or by reducing the pressure in the reactor, generally while continuing to agitate the mixture with the high intensity mixer. Water removal is generally continued until the water content of the mixture has been decreased by at least 5 wt %, such as by at least 10%, for example, from about 10 to about 20 wt %. By removing the excess water, the partially dried molecular sieve crystals can be recovered from the reactor and then subjected to calcination to remove the organic directing agent without an initial filtration or washing step. Typically, the partially dried molecular sieve crystals contain from about 15 to about 25 wt % water and about 40 to 45% of surfactant.

Alternatively, when crystallization is complete and the mixture in the reactor has been partially dried, it may also be desirable to add an additional particulate material to the reactor and then employ the high intensity mixer to admix the additional particulate material with the crystalline molecular sieve and the mother liquor remaining after the drying process. For example, the additional particulate material could be a catalyst formulation component, such as a binder or matrix material, in which case the product mixture recovered from the reactor after addition of the additional particulate material could be extruded into a shaped catalyst body. After calcination to remove the organic directing agent, the shaped body could be used directly as a catalyst in an organic conversion reaction.

As a further alternative, after crystallization and partial drying, the product mixture can be removed from the reactor and mixed with the additional particulate material, such as a binder or matrix material, in a separate mixer before being extruded into a shaped catalyst body and calcined to remove the organic directing agent.

In either case, after calcination to remove the organic directing agent, the catalyst body can be subjected to ion exchange to reduce the level of the alkali or alkaline earth metal, M, present in the catalyst. Generally, the ion exchange is with ammonium cations and is followed by calcination to convert the molecular sieve from the ammonium to the hydrogen form.

In addition, where the resultant catalyst is to be used in lube hydrofinishing, it may be desirable to incorporate a noble metal in the catalyst, such as a noble metal selected from platinum, palladium, iridium and mixtures of the aforementioned metals, preferably at least platinum, and more preferably, a combination of platinum and palladium. This can be achieved by impregnation or ion exchange of the shaped body catalyst body with a noble metal-containing compound, generally followed by calcination in air.

Hydrofinishing is generally conducted on lube oil feedstocks that have undergone a prior dewaxing step. Hydrofinishing is a form of mild hydrotreating directed to saturating any lube range olefins and residual aromatics, as well as to removing any remaining heteroatoms and color bodies, in the dewaxed product. The post dewaxing hydrofinishing is usually carried out in cascade with the dewaxing step. Generally, the hydrofinishing will be carried out at temperatures from about 150° C. to 350° C., preferably 180° C. to 250° C. Total pressures are typically from 2859 to 20786 kPa (about 400 to 3000 psig), liquid hourly space velocities are typically from 0.1 to 5 hr$^{-1}$, preferably 0.5 to 3 hr$^{-1}$ and hydrogen treat gas rates of from 44.5 to 1780 m$^3$/m$^3$ (250 to 10,000 scf/B).

The invention will now be more particularly described with reference to the following non-limiting Examples and the accompanying drawings.

In the Examples, the XRD diffraction patterns of the as-synthesized materials were recorded on a Bruker D4 X-Ray Powder Diffractometer using copper Kα radiation in the 2θ range of 2 to 40 degrees.

The SEM images were obtained on a HITACHI S4800 Field Emission Scanning Electron Microscope (SEM).

The BET surface area was measured by Micromeritics TriStar 3000 V6.05A (Micromeritics Corporation, Norcross, Ga.) with the sample being pretreated at 350° C. in air.

Figure 2:
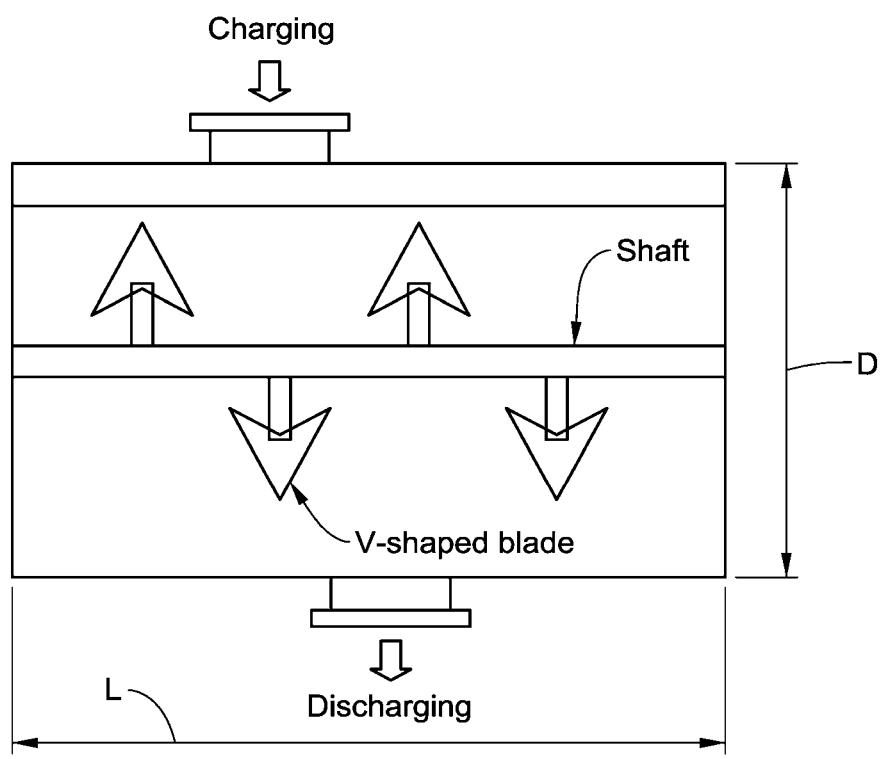

The reactor employed in the Examples is depicted in FIGS. 1 and 2 and comprises a 5 gallon commercial pilot-scale horizontal plough shear mixer/dryer, M/DVT-22 Lab Mixer available from Littleford, Day, Inc. of Florence, Ky., USA. The reactor comprises a horizontal cylinder having a length of about 10 inch (25.4 cm), a diameter of about 12 inch (30 cm) and a length to diameter ratio of 0.83. The reactor has a top mounted charge opening and a bottom mounted discharge opening, both of which can be sealed during operation of the reactor. Mounted within the reactor is a horizontally disposed rotatable shaft which, as shown in FIG. 2, supports four internal heat-transfer plough blades. Each plough blade is V-shaped so that, as it rotates, it splits the reaction mixture into separate streams and lifts and rolls the split streams on either side of the blade, resulting in efficient mixing of even high viscosity slurries. The vessel is jacketed and can be sealed and pressurized and heated with hot water or steam. The vessel can be equipped with a condenser to remove and condense off-gas from the vessel that is produced during the drying process.

Example 1

A mixture with about 27 wt % solids was prepared from 3203 g of tetraethylammonium hydroxide (TEAOH) 35% solution, 405 g of sodium aluminate 45% solution, 15 g of a diluted antifoam solution prepared from Dow Corning 62 antifoamant, 5651 g of ARQUAD 12/37 solution, and 3677 g of Sipernat silica. The components of the mixture were charged directly into the mixer/dryer shown in FIG. 1 through the top mount opening and mixed with the mixer rotating at 110 rpm for 20 minutes. The mixture had the following molar composition:

| | |
|---|---|
| SiO$_2$/Al$_2$O$_3$ | ~50/1 |
| H$_2$O/SiO$_2$ | ~7.2 |
| TEAOH/Surfactant | ~1 |
| SiO$_2$/Surfactant | ~5.8. |

The reactor was sealed and mixture reacted at 240° F. (116° C.) with agitation at 20 rpm for 24 hours. One gallon of the resulting high viscosity slurry product was then discharged and stored in a 5-gallon pail container for later use. The charge valve was then opened to allow water to escape from the reactor to reduce the water content of the slurry and produce a partially dried product with a solids content of 33.2%.

Figure 3:
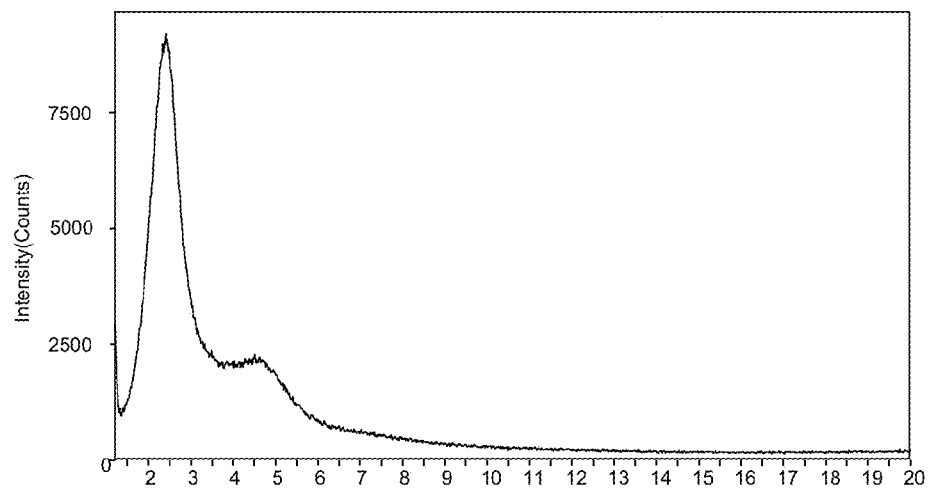
FIG. 3 is an X-ray diffraction (XRD) pattern of the as-calcined MCM-41 material from Example 1.

The partially dried as-synthesized material showed the typical pure phase of MCM-41 topology, set out in FIG. 3. The SEM of the as-synthesized material shows that the material was composed of agglomerates of small crystals. The calcined, washed product shows a surface area of about 950 m$^2$/g. Based on these results, it would appear that high quality of MCM-41 product can be prepared from higher solid-content synthesis mixtures of about 27 wt % in this reactor with mild agitation. The unwashed, partially dried product was estimated to contain about 10-15 wt % of soluble silica.

Example 2

Three MCM-41/alumina catalysts with ratios of 95/5, 90/10, and 80/20, respectively, were prepared from three samples of the unwashed, partially dried product and Versal 300 alumina (available from UOP) which were mulled and formed into one-sixteenth inch (1.6 mm) cylindrical extrudates. The prepared extrudates were dried at 250° F. (121° C.) before use. The dried extrudates were then calcined in air at 1000° F. (538° C.) for four hours. The final catalyst showed a high surface area of about 620 m$^2$/g and Na content of about 1 wt %. The calcined extrudates were then converted into the hydrogen form by ion exchange with ammonium nitrate solution at room temperature and 140° F. (60° C.), followed by drying at 250° F. (121° C.) and calcination at 1000° F. (538° C.) for six hours. The resulting treated extrudates showed very low Na levels-0.18 wt % for the 95/5 sample (1.06 wt % before exchanging), 0.15 wt % for the 90/10 sample (1.02 wt % before exchanging), and 0.13 wt % for the 80/20 sample (0.914 wt % before exchanging).

The three calcined exchanged extrudate samples were then co-impregnated with 0.3 wt % platinum and 0.9 wt % palladium and dried at 120° C. The catalysts then received a final calcination in air at 304° C. to decompose the platinum and palladium compounds. Benzene Hydrogenation Activity Index for the resulting catalysts was determined as follows:

Each catalyst was first reduced at a selected temperature (120-350° C.) for one hour in hydrogen. The catalyst was cooled to the reaction temperature and the feed (benzene and hydrogen) was passed through the catalyst. The rate of benzene hydrogenation was measured for 50, 75, 100 and 125° C. The data are zero-order Arrhenius and the rate constant in moles of product per mole of metal per hour at 100° C. is reported.

Properties of the finished catalysts are summarized as follows:

| Description | Pt, wt % | Pd, wt % | Surface Area, m2/g | Benzene Hydrogenation Activity Index |
|---|---|---|---|---|
| 95/5 | 0.253 | 0.68 | 754 | 73 |
| 90/10 | 0.26 | 0.78 | 648 | 110 |
| 80/20 | 0.26 | 0.73 | 686 | 97 |

Example 3

The 90/10 sample from Example 2 was evaluated for hydrofinishing a 600N dewaxed oil that was previously hydrotreated to reduce the sulfur content to about 200 ppm. Approximately 5 cc of catalyst was loaded into an upflow micro-reactor, with about 3 cc of 80 to 120 mesh sand added to the catalyst to ensure uniform liquid flow. After pressure testing with nitrogen and hydrogen, the catalyst was dried in nitrogen at 260° C. for about 3 hours, cooled to room temperature, activated in hydrogen at about 260° C. for 8 hours and cooled to 150° C. Feed was introduced and operating conditions adjusted to 2.0 LHSV, 6995 kPa (1000 psig), and about 450 NM$^3$/m$^3$ (2500 scf/b). Reactor temperature was increased to 275° C. and then held constant for about 7 to 10 days. Hydrogen purity was 100% and no gas recycle was used.

Figure 4:
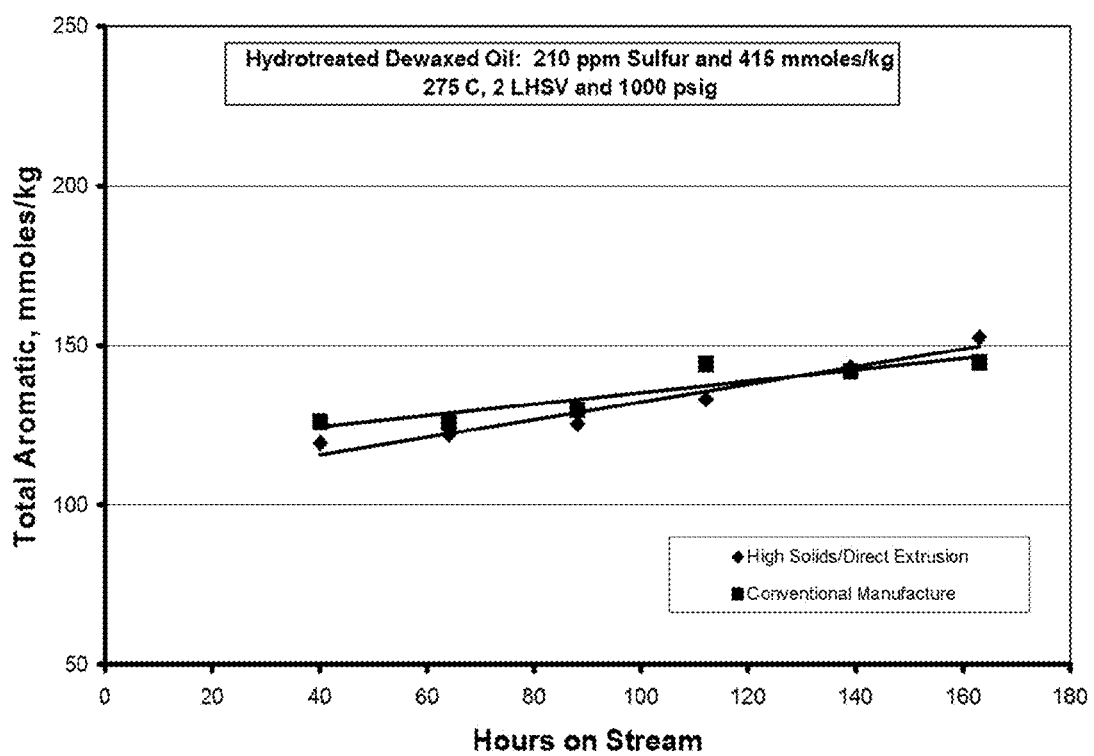
FIG. 4 is a graph of total aromatic content against hours on stream in the hydrofinishing of a dewaxed lube oil base stock using a PtMCM-41 catalyst synthesized as in Example 2 and an identical catalyst produced by conventional methods.

Product quality as defined by aromatics, sulfur, hydrogen and nitrogen contents was monitored daily. Aromatics were measured via UV absorption (mmole/kg) and plotted versus hours on stream for the 90/10 sample of the present disclosure, as well as for a comparative MCM-41-containing catalyst, differing in its manufacture by a conventional process which results in greater wastewater production. The conventional process utilizes lower throughput, complete drying, as well as washing/filtration steps, prior to extrusion with alumina. As shown in FIG. 4, total aromatics production over about 40 to 170 hours by the catalyst prepared in accordance with the present disclosure was essentially equivalent to that of the comparative catalyst manufactured by conventional processes.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A process for producing a molecular sieve material having an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C., said process comprising the steps of:
   (a) preparing a synthesis mixture capable of forming said molecular sieve material by combining in a reactor equipped with a mixer having a Froude number of at least 1, at least water, a source of at least one oxide selected from the group consisting of divalent element W, trivalent element X, tetravalent element Y and pentavalent element Z, a source of an alkali or alkaline earth metal M, and an organic directing agent (R) having the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof and the remainder of $R_1$, $R_2$, $R_3$ and $R_4$ is selected from the group consisting of hydrogen, alkyl of from 1 to 5 carbon atoms and combinations thereof, said synthesis mixture having a solids content of at least 20 wt %;
   (b) heating the synthesis mixture in the reactor while agitating the mixture with said mixer to form a product mixture comprising water and crystals of said molecular sieve material; and then
   (c) removing at least part of the water from the product mixture in the reactor so as to decrease the water content of product mixture inside the reactor by at least 5 wt %.

2. The process of claim 1, wherein the synthesis mixture has a composition, in terms of mole ratios, within the following ranges:

| | |
|---|---|
| $X_2O_3/YO_2$ | 0 to 0.5 |
| $X_2O_3/(YO_2 + Z_2O_5)$ | 0 to 100 |
| $X_2O_3/(YO_2 + WO + Z_2O_5)$ | 0 to 100 |
| $H_2O/(X_2O_3 + YO_2 + WO + Z_2O_5)$ | 2 to 10 |
| $OH^-/YO_2$ | 0 to 10 |
| $M_{2/e}O/(X_2O_3 + YO_2 + WO + Z_2O_5)$ | 0 to 10 |
| $R_{2/f}O/(X_2O_3 + YO_2 + WO + Z_2O_5)$ | 0.01 to 2 | where e and f are the valence of M and R respectively.

3. The process of claim 1, wherein the synthesis mixture has a composition, in terms of mole ratios, within the following ranges:

| | |
|---|---|
| $X_2O_3/YO_2$ | 0 to 0.5 |
| $H_2O/(X_2O_3 + YO_2)$ | 2 to 10 |
| $OH^-/YO_2$ | 0.1 to 10 |
| $M_{2/e}O/(X_2O_3 + YO_2)$ | 0.1 to 10 |
| $R_{2/f}O/(X_2O_3 + YO_2)$ | 0.01 to 2 | where e and f are the valence of M and R respectively.

4. The process of claim 1, wherein the reactor has a capacity of at least 5 liters.

5. The process of claim 1, wherein the mixer comprises at least one blade located on a shaft rotatable about an axis oriented at no more than 10 degrees from horizontal.

6. The process of claim 1, wherein water is removed from the product mixture in step (c) by the application of heat to and/or the reduction of pressure on the product mixture.

7. The process of claim 1, wherein the product mixture is agitated with the mixer during the removing step (c).

8. The process of claim 1 and further comprising the step of:
(d) mixing said partially dried mixture with an additional particulate material, either in the reactor or in a separate mixer, to produce an extrudable mixture.

9. The process of claim 8, wherein said additional particulate material is a catalyst formulation component.

10. The process of claim 8, wherein said additional particulate material is a binder or matrix material.

11. The process of claim 8 and further comprising the step of:
(e) extruding said extrudable mixture into a shaped catalyst body.

12. The process of claim 11 and further comprising the steps of:
(f) calcining the shaped catalyst body; and
(g) subjecting the calcined catalyst body to ion exchange to reduce the level of alkali or alkaline earth metal M in the body.

13. The process of claim 11 and further comprising the step of:
(f) combining the catalyst body with at least one noble metal compound.

14. The process of claim 13, wherein said noble metal is selected from platinum, palladium, iridium and mixtures thereof.

15. A process for hydrofinishing a lubricant base stock comprising contacting the base stock under hydrofinishing conditions with a catalyst comprising a molecular sieve material produced by the process of claim 1.

\* \* \* \* \*